United States Patent
Kim et al.

(10) Patent No.: US 9,620,771 B2
(45) Date of Patent: Apr. 11, 2017

(54) CATHODE ACTIVE MATERIAL, CATHODE AND LITHIUM BATTERY INCLUDING CATHODE ACTIVE MATERIAL, AND METHOD OF PREPARING THE CATHODE ACTIVE MATERIAL

(71) Applicant: Samsung SDI Co., Ltd., Yongin, Gyeonggi-Do (KR)

(72) Inventors: Myung-hoon Kim, Seoul (KR); Jae-gu Yoon, Suwon-si (KR); Min-sik Park, Hwaseong-si (KR); Jin-hwan Park, Seoul (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 776 days.

(21) Appl. No.: 13/954,280

(22) Filed: Jul. 30, 2013

(65) Prior Publication Data
US 2014/0193714 A1    Jul. 10, 2014

(30) Foreign Application Priority Data
Jan. 7, 2013    (KR) ......................... 10-2013-0001784

(51) Int. Cl.
*H01M 4/36* (2006.01)
*H01M 4/505* (2010.01)
(Continued)

(52) U.S. Cl.
CPC ........... *H01M 4/364* (2013.01); *H01M 4/505* (2013.01); *C01G 45/1257* (2013.01);
(Continued)

(58) Field of Classification Search
CPC ...... H01M 4/364; H01M 4/505; H01M 4/485; H01M 4/525; H01M 10/052;
(Continued)

(56) References Cited

U.S. PATENT DOCUMENTS

| | | | |
|---|---|---|---|
| 6,677,082 B2 | 1/2004 | Thackeray et al. | |
| 7,205,072 B2 | 4/2007 | Kang et al. | |
| 7,303,840 B2 | 12/2007 | Thackeray et al. | |
| 7,314,682 B2 | 1/2008 | Thackeray et al. | |
| 7,479,352 B2 | 1/2009 | Yoon et al. | |
| 2008/0070122 A1* | 3/2008 | Park ...................... | H01M 4/131 429/330 |

(Continued)

FOREIGN PATENT DOCUMENTS

| | | |
|---|---|---|
| JP | 06-044972 A | 2/1994 |
| JP | 2001-146425 A | 5/2001 |

(Continued)

OTHER PUBLICATIONS

Yabuuchi et al., "Detailed Studies of a High-Capacity Electrode Material for Rechargeable Batteries, Li2MnO3-LiCo1/3Mn1/3O2", J. Am. Chem. Soc., vol. 133, 2011. pp. 4404-4419.

*Primary Examiner* — Gary Harris
(74) *Attorney, Agent, or Firm* — Lee & Morse, P.C.

(57) ABSTRACT

A cathode active material including a lithium metal oxide composite having a first domain and a second domain and represented by Formula 1:

$x[Li_{2-y}(M1)_{1-z}(M2)_{y+z}O_3]\cdot(1-x)[LiMeO_2]$    Formula 1 wherein
$0 < x < 1$,
$0 \le y < 1$,
$0 \le z < 1$,
$0 < y+z < 1$,
M1 includes at least one transition metal,
M2 includes at least one metal selected from magnesium (Mg), aluminum (Al), vanadium (V), zinc (Zn), molybdenum (Mo), niobium (Nb), lanthanum (La), and ruthenium (Ru), and
Me includes at least one metal selected from nickel (Ni), cobalt (Co), manganese (Mn), iron (Fe), chromium (Cr), titanium (Ti), copper (Cu), aluminum (Al), magnesium (Mg), zirconium (Zr), and boron (B).

20 Claims, 6 Drawing Sheets

(51) Int. Cl.
  *H01M 4/485* (2010.01)
  *H01M 4/525* (2010.01)
  *H01M 10/052* (2010.01)
  *C01G 45/12* (2006.01)
  *C01G 53/00* (2006.01)

(52) U.S. Cl.
  CPC .......... *C01G 53/50* (2013.01); *C01P 2004/80* (2013.01); *C01P 2006/40* (2013.01); *H01M 4/485* (2013.01); *H01M 4/525* (2013.01); *H01M 10/052* (2013.01); *Y02T 10/7011* (2013.01)

(58) Field of Classification Search
  CPC . Y02T 10/7011; C01G 53/50; C01G 45/1257; C01P 2004/80; C01P 2006/40; Y02E 60/122
  USPC ........................................................ 429/220
  See application file for complete search history.

(56) References Cited

U.S. PATENT DOCUMENTS

| | | |
|---|---|---|
| 2009/0087746 A1 | 4/2009 | Kang et al. |
| 2009/0220859 A1 | 9/2009 | Yoon et al. |
| 2010/0086854 A1 | 4/2010 | Kumar et al. |
| 2012/0164532 A1* | 6/2012 | Senoue ................ H01M 4/485 429/219 |

FOREIGN PATENT DOCUMENTS

| | | |
|---|---|---|
| JP | 2002-170562 A | 6/2002 |
| JP | 2004-083388 A | 3/2004 |
| JP | 2009-176583 A | 8/2009 |
| JP | 2009-187807 A | 8/2009 |
| JP | 2010-135285 A | 6/2010 |
| JP | 2011-076997 A | 4/2011 |

* cited by examiner

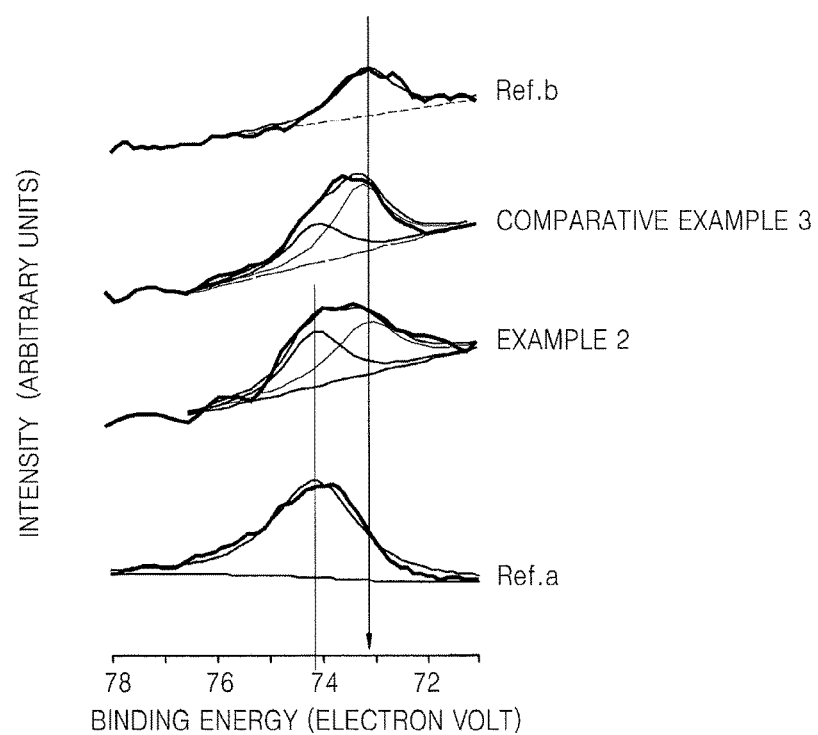
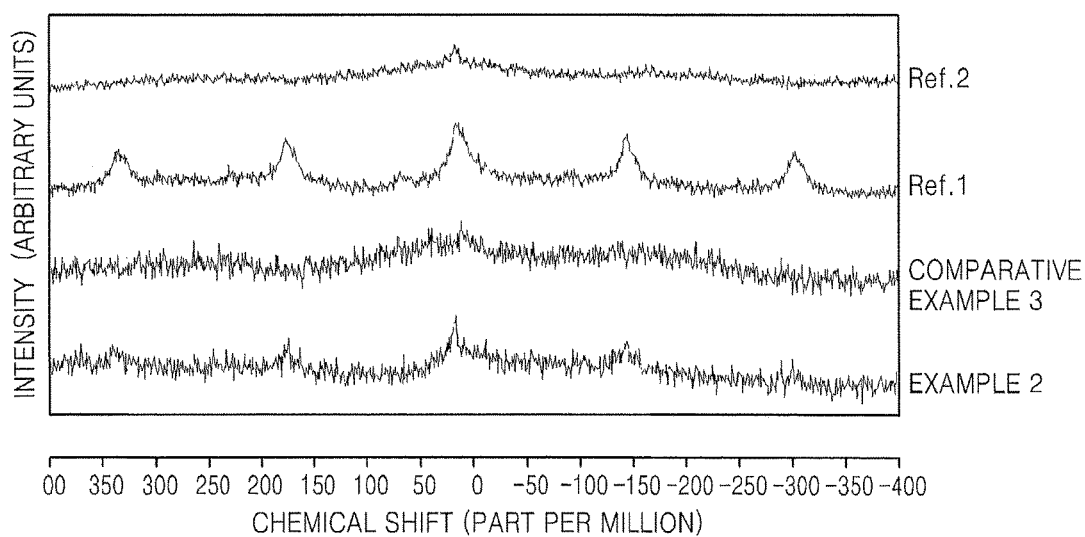

CATHODE ACTIVE MATERIAL, CATHODE AND LITHIUM BATTERY INCLUDING CATHODE ACTIVE MATERIAL, AND METHOD OF PREPARING THE CATHODE ACTIVE MATERIAL

CROSS-REFERENCE TO RELATED APPLICATION

This application claims priority to and the benefit of Korean Patent Application No. 10-2013-0001784, filed on Jan. 7, 2013, and all the benefits accruing therefrom under 35 U.S.C. §119, the content of which is incorporated herein in its entirety by reference.

BACKGROUND

1. Field

The present disclosure relates to a cathode active material, a cathode including the cathode active material, a lithium battery including the cathode active material, and methods of preparing the cathode active material, and more particularly, to a cathode active material that provides improved discharge voltage capacity retention and cycle life characteristics.

2. Description of the Related Art

A lithium battery such as a lithium ion battery ("LIB") has been adopted as a power source for many portable devices due to its high energy density and its simple design. In recent years, an LIB has been adopted as a power source for electric vehicles and electricity storage in addition to portable information technology ("IT") devices, and studies regarding materials for achieving a high energy density or a long-life of an LIB are being expanded accordingly.

As cathode active materials for a lithium battery, transition metal oxides such as $LiNiO_2$, $LiCoO_2$, $LiMn_2O_4$, $LiFePO_4$, $LiNi_xCo_{1-x}O_2$ (where $0 \leq x \leq 1$), and $LiNi_{1-x-y}Co_xMn_yO_2$ (where $0 \leq x \leq 0.5$ and $0 \leq y \leq 0.5$) and lithium are used.

However, $LiCoO_2$ is relatively expensive and its specific capacity is about 140 milliampere hours per gram (mAh/g), and thus $LiCoO_2$ has a limited electrical capacity. When $LiCoO_2$ is used at an increased charge voltage up to 4.2 V or more, 50% or more lithium is removed to provide $Li_{1-x}CoO_2$ (where $x > 0.5$). An oxide in the form of $Li_{1-x}CoO_2$ (where $x > 0.5$) is structurally unstable, and its capacity rapidly decreases with subsequent charge and discharge cycles.

Cathode active materials such as $LiNi_xCo_{1-x}O_2$ (where $x < 1$) or $LiNi_{1-x-y}Co_xMn_yO_2$ (where $0 \leq x \leq 0.5$ and $0 \leq y \leq 0.5$) have decreased structural stability at high voltages.

A lithium metal oxide in the form of $Li[Li_xK_{1-x}]O_2$ (where $x > 0$ and M' represents a plurality of transition metals) has theoretically a specific capacity of about 250~280 mAh/g, and could provide increased electrical capacity. However, a lithium metal oxide including an excessive amount of lithium has decreased structural stability at a high voltage so that a discharge voltage is rapidly decreased and its cycle life characteristics become poor.

Therefore, there remains a need for a new cathode active material that has high capacity, inhibits a discharge voltage drop, has improved structural stability at a high voltage, and has improved cycle life characteristics, and a method of preparing the new cathode active material.

SUMMARY

Provided is a cathode active material that has high capacity, inhibits a discharge voltage drop, and has improved cycle life characteristics.

Provided is a cathode including the cathode active material.

Provided is a lithium battery including the cathode active material.

Provided are methods of preparing the cathode active material that has high capacity, inhibits a discharge voltage drop, and has improved cycle life characteristics.

Additional aspects will be set forth in part in the description which follows and, in part, will be apparent from the description.

According to an aspect, a cathode active material includes a lithium metal oxide composite including a first domain and a second domain and represented by Formula 1:

$x[Li_{2-y}(M1)_{1-z}(M2)_{y+z}O_3]\cdot(1-x)[LiMeO_2]$   Formula 1 wherein
$0 < x < 1$,
$0 \leq y < 1$,
$0 \leq z < 1$,
$0 < y+z < 1$,
M1 includes at least one transition metal,
M2 includes at least one metal selected from magnesium (Mg), aluminum (Al), vanadium (V), zinc (Zn), molybdenum (Mo), niobium (Nb), lanthanum (La), and ruthenium (Ru), and
Me includes at least one metal selected from nickel (Ni), Cobalt (Co), manganese (Mn), iron (Fe), chromium (Cr), titanium (Ti), copper (Cu), aluminum (Al), magnesium (Mg), zirconium (Zr), and boron (B).

According to another aspect, a cathode includes the cathode active material described above.

According to another aspect, a lithium battery includes a cathode; an anode; and an electrolyte disposed between the cathode and the anode; wherein the cathode includes the above described cathode active material.

According to another aspect, a method of preparing a lithium metal oxide composite including a first domain and a second domain includes: contacting a first lithium precursor, a transition metal precursor, and a metal dopant precursor to prepare a first mixture; firstly heat treating the first mixture to prepare a first domain lithium metal oxide; contacting the first domain lithium metal oxide with a second lithium precursor and a metal precursor to prepare a second mixture; and secondly heat treating the second mixture to prepare a second domain lithium metal oxide to prepare the lithium metal oxide composite, wherein the lithium metal oxide composite is represented by Formula 1:

$x[Li_{2-y}(M1)_{1-z}(M2)_{y+z}O_3]\cdot(1-x)[LiMeO_2]$   Formula 1 wherein
$0 < x < 1$,
$0 \leq y < 1$,
$0 \leq z < 1$,
$0 < y+z < 1$,
M1 includes at least one transition metal,
M2 includes at least one metal selected from magnesium (Mg), aluminum (Al), vanadium (V), zinc (Zn), molybdenum (Mo), niobium (Nb), lanthanum (La), and ruthenium (Ru), and Me includes at least one metal selected from nickel (Ni), Cobalt (Co), manganese (Mn), iron (Fe), chromium (Cr), titanium (Ti), copper (Cu), aluminum (Al), magnesium (Mg), zirconium (Zr), and boron (B).

BRIEF DESCRIPTION OF THE DRAWINGS

These and/or other aspects will become apparent and more readily appreciated from the following description of the embodiments, taken in conjunction with the accompanying drawings in which:

FIG. 3 is a graph of intensity (arbitrary units, a. u.) versus binding energy (electron volts, eV), and is a graphical view of an Al2p surface spectrum (71-78 eV) of the cathode active materials prepared according to Example 2 and Comparative Example 3 by X-ray Photoelectron Spectroscopy ("XPS");

FIG. 4 is a graph of intensity (arbitrary units, a. u.) versus chemical shift (parts per million, ppm), and is a graphical view of a $^{27}$Al-NMR spectrum of cathode active materials prepared according to Example 2 and Comparative Example 3;

DETAILED DESCRIPTION

Figure 1:
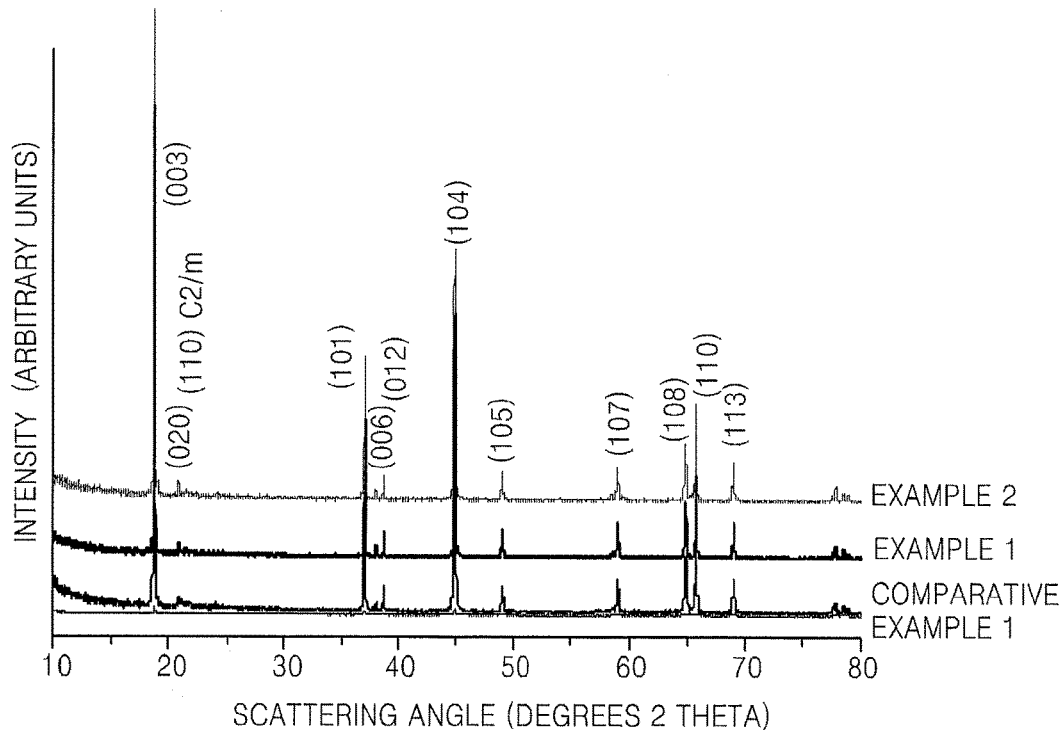
FIG. 1 is a graph of intensity (arbitrary units, a. u.) versus scattering angle (degrees 2θ), and is a graphical view of X-ray diffraction ("XRD") results showing a crystal structure of a cathode active material prepared according to Examples 1 and 2, and Comparative Example 1.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

It will be understood that when an element such as a layer, film, region, or substrate is referred to as being "on" another element, it can be directly on the other element or intervening elements may also be present. In contrast, when an element is referred to as being "directly on" another element, there are no intervening elements present.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to other elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below. Expressions such as "at least one of," when preceding a list of elements, modify the entire list of elements and do not modify the individual elements of the list.

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

"Transition metal" as defined herein refers to an element of Groups 3 to 11 of the Periodic Table of the Elements. Non-limiting examples of transition metals include scandium, titanium, vanadium, chromium, manganese, iron, cobalt, nickel, copper, yttrium, zirconium, niobium, molybdenum, technetium, ruthenium, rhodium, palladium, silver, lanthanum, hafnium, tantalum, tungsten, rhenium, osmium, iridium, platinum, gold, actinium, rutherfordium, dubnium, seaborgium, bohrium, hassium, meitnerium, darmstadtium, and roentgenium.

"Mixture" as used herein is inclusive of all types of combinations, including physical mixtures, blends, alloys, solutions, and the like.

A C rate means a current which will discharge a battery in one hour, e.g., a C rate for a battery having a discharge capacity of 1.6 ampere-hours would be 1.6 amperes.

"Composite" means a material comprising a plurality of domains.

A cathode active material according to an embodiment includes a lithium metal oxide composite comprising a first domain and a second domain and represented by Formula 1:

$$x[Li_{2-y}(M1)_{1-z}(M2)_{y+z}O_3]\text{-}(1-x)[LiMeO_2] \quad \text{Formula 1}$$

wherein
0<x<1,
0≤y<1,
0≤z<1,
0<y+z<1,
M1 includes at least one transition metal,
M2 includes at least one metal selected from magnesium (Mg), aluminum (Al), vanadium (V), zinc (Zn), molybdenum (Mo), niobium (Nb), lanthanum (La), and ruthenium (Ru), and
Me includes at least one metal selected from nickel (Ni), cobalt (Co), manganese (Mn), iron (Fe), chromium (Cr), titanium (Ti), copper (Cu), aluminum (Al), magnesium (Mg), zirconium (Zr), and boron (B).

The first domain of the lithium metal oxide may be represented by Formula 2:

$$Li_{2-y}(M1)_{1-z}(M2)_{y+z}O_3 \quad \text{Formula 2}$$

wherein
0<x<1,
0≤y<1,
0≤z<1, and
0<y+z<1;
M1 comprises at least one transition metal; and
M2 comprises at least one metal selected from magnesium, aluminum, vanadium, zinc, molybdenum, niobium, lanthanum, and ruthenium.

The second domain of the lithium metal oxide may be represented by Formula 3:

$$LiMeO_2 \quad \text{Formula 3}$$

wherein Me comprises at least one metal selected from nickel, cobalt, manganese, iron, chromium, titanium, copper, aluminum, magnesium, zirconium, and boron.

The lithium metal oxide composite comprises a first domain, e.g., a $Li_2MO_3$ domain wherein M is a first metal M1 which comprises at least one transition metal, and a second domain, e.g., a $LiMeO_2$ domain. In an embodiment the composite consists of the first domain and the second domain. Li and/or some of the first metal M1, e.g., a transition metal, included in the $Li_2MO_3$ domain may be selectively substituted with, e.g., doped by, a second metal M2. While not wanting to be bound by theory, it is believed that the inclusion of the second metal improves a structural stability of the lithium metal oxide composite. A lithium battery including the lithium metal oxide composite may have a reduced discharge voltage drop and improved cycle life characteristics over a number of charge/discharge cycles.

An embodiment will be described in further detail with regard to the structural stability of the lithium metal oxide composite. However, these examples shall not limit the scope of the present disclosure.

While not wanting to be bound by theory, it is understood that when a lithium metal oxide is charged with high voltage of 4.4 Volts ("V") or greater, deintercalation of lithium occurs and oxygen is generated at the same time in the $Li_2MO_3$ phase (where M is M1). Accordingly, it is understood that a $Li_2O$ phase is formed and then oxidized to an $MO_2$ phase. However, on discharge, the $MO_2$ phase does not revert to the starting material ($Li_2MO_3$) due to the reduction of the $MO_2$ phase to the $LiMO_2$ phase. Therefore, in a process of a charge and discharge with high voltage, an amount of the residual $Li_2MO_3$ domain, which is understood to contribute to structural stability of the lithium metal oxide composite, is decreased.

In order to improve its structural stability, the lithium metal oxide may be doped with a metal. However, when a formation energy, which depends on a location of the metal that dopes the lithium metal oxide, is calculated by a computer simulation, the formation energy generated in the $LiMeO_2$ domain may be lower than the formation energy generated in the $Li_2MO_3$ domain (where M is M1). That is, when a lithium metal oxide composite is doped by bulk-doping, the $LiMeO_2$ domain ends up highly doped by the metal and, as a result, it becomes difficult to improve the structural stability of the lithium metal oxide composite.

Therefore, Li and/or some of the transition metal included in the $Li_2MO_3$ domain may be selectively doped by the second metal M2 so that the structural stability of the lithium metal oxide may be improved.

For example, the lithium metal oxide of Formula 1 may have y in a range of 0≤y<0.5, specifically 0.05≤y<0.4.

For example, the lithium metal oxide composite of Formula 1 may have z in a range of 0≤z<0.5, specifically 0.05≤z<0.4. The variables y and z represent amounts of the second metal M2 that are selectively doped in the $Li_2(M1)O_3$ domain. When values of the y and the z are excessive, discharge capacity of the lithium battery may be decreased. In contrast, when values of the y and the z are too low, the structural stability may not be significantly improved.

In an embodiment M1 in Formula 1 is Mn.

Li and/or some of the transition metal, e.g., Mn, included in the first domain, e.g., the $Li_2MnO_3$ domain, may be selectively doped with the second metal M2 so that the lithium metal oxide composite of Formula 1 may further inhibit a decrease in an amount of the $Li_2MnO_3$ domain during a charge and discharge, and thus may further improve the structural stability of the lithium metal oxide composite.

The lithium metal oxide composite may comprise a domain having a layered structure having the $NaFeO_2$ structure type and hexagonal crystallographic symmetry. The domain may have a crystal structure in which lattice constant c of a length of a c-axis is 14.24 Angstroms ("Å") or more. The lattice constant c of 14.24 Å or more may facilitate ion transport and thus provide improved electrochemical characteristics. The lattice constant c of a length of the c-axis in the lithium metal oxide may be confirmed by a pattern decomposition, which will be further described later in Analysis Example 1.

The lithium metal oxide may have a ratio of a peak intensity of a primary peak corresponding to a 003 plane to a peak intensity of a secondary peak corresponding to a 104 plane ($I_{(003)}/I_{(104)}$) in an X-ray diffraction ("XRD") spectrum of 1.3 or greater.

The lithium metal oxide may have a particle size of crystalline particles of the lithium metal oxide composite, when determined by analysis of a full width at half maximum ("FWHM") of a peak corresponding to the 003 plane in an XRD spectrum, of 80 nanometers ("nm") or greater, for example, in a range of about 80 nm to about 150 nm. The peak intensity ratio of $I_{(003)}/I_{(104)}$ and a FWHM of a peak corresponding to the 003 plane may be confirmed by the XRD results of FIG. 1, which will be further described below.

When the particle size when determined by analysis of a FWHM of a peak corresponding to the 003 plane is within the above-mentioned range as determined based on the XRD peak intensity ratio of $I_{(003)}/I_{(104)}$ and Scherrer's equation, the lithium metal oxide may have increased structural stability so that a lithium battery including the lithium metal oxide composite may provide lithium ions with stable insertion and deintercalation to improve cycle life characteristics.

The lithium metal oxide composite may have a separation distance between a peak corresponding to a 108 plane having a scattering angle of about 64.5°±0.5° two-theta (2θ) and a peak corresponding to a 110 plane having a scattering angle of about 65.5°±0.5° 2θ in an XRD spectrum of 0.8° or greater. For example, the separation distance therebetween may be in a range of about 0.8° to about 1.0° 2θ.

Figure 2:
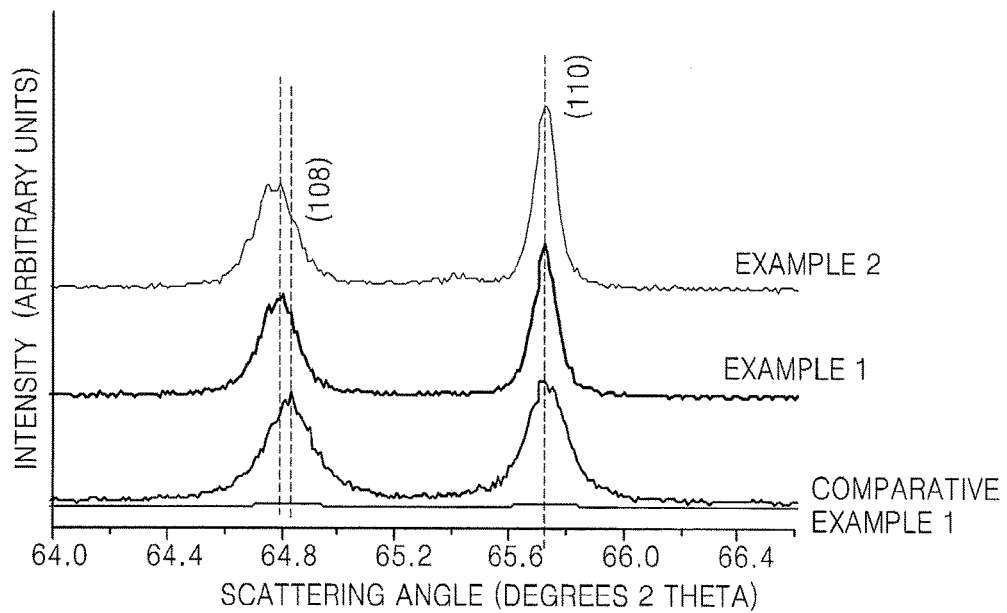
FIG. 2 is a graph of intensity (arbitrary units, a. u.) versus scattering angle (degrees 2θ), and is an expanded graphical view of peaks corresponding to an 108 plane and an 110 plane at a scattering angle of about 64.5°±0.5° to about 65.5°±0.5° in the XRD result of FIG. 1.

The lithium metal oxide may have a peak intensity ratio of $I_{(003)}/I_{(104)}$ and a separation distance between a peak corresponding to the 108 plane having a scattering angle of about 64.5°±0.5° 2θ and a peak corresponding to the 110 plane having a scattering angle of about 65.5°±0.5° 2θ, and the results may be confirmed by the XRD spectrum as shown in FIG. 2, which will be further described below.

The lithium metal oxide may have a peak intensity ratio of $I_{(003)}/I_{(104)}$ and a separation distance between a peak corresponding to the 108 plane having a scattering angle of about 64.5°±0.5° 2θ and a peak corresponding to the 110 plane having a scattering angle of about 65.5°±0.5° 2θ in an XRD spectrum and may be high in comparison with overlithiated metal oxide that is either not doped by a metal or entirely doped by a metal. Thus, the lithium metal oxide may have crystals in a regular arrangement in comparison with the overlithiated metal oxide that is either not doped by a metal or that is entirely doped by a metal. Therefore, the lithium metal oxide composite may provide a lithium battery having improved structural stability.

A cathode according to another aspect includes the cathode active material described above.

An operational voltage, e.g., a charge voltage, of the cathode active material may be about 4.3 V±0.1 V versus lithium, and the cathode active material may be a high voltage-based cathode active material.

The cathode may be manufactured as follows.

The cathode active material described above, a conducting agent, a binder, and a solvent are mixed to prepare a cathode active material composition. The cathode active material composition may be directly coated and dried on an aluminum current collector to manufacture a cathode plate in which layers of the cathode active material are formed. Alternatively, the cathode active material composition may be cast on a separate support to form a cathode active material film, and then the cathode active material film may be separated from the support and laminated on an aluminum current collector to manufacture a cathode plate in which a layer of the cathode active materials are formed.

Examples of the conducting agent include carbons, such as carbon black, activated carbon, graphite particulate, natural graphite, artificial graphite, acetylene black, ketjen black, carbon fibers, carbon nanofiber, carbon nanowire, carbon nanotube, carbon nanohorn, carbon nanoring, carbon aerogel, carbon cryogel, mesocarbon, and mesocarbon microbead.

Examples of the conducting agent may also include a metal, such as metal powder, metal tube, or metal fiber of copper, nickel, aluminum, and silver.

In addition, examples of the conducting agent may include a conductive polymer such as a polyphenylene or a polyphenylene derivative, but are not limited thereto.

Any suitable material available as a conducting agent in the art may be used.

Examples of the binder include a vinylidene fluoride/hexafluoropropylene, copolymer, polyvinylidene fluoride ("PVDF"), polyacrylonitrile, polymethylmethacrylate, polytetrafluoroethylene ("PTFE"), polyvinyl pyrrolidone, polypropylene, polyvinyl alcohol, carboxymethyl cellulose, hydroxypropyl cellulose, diacetyl cellulose, and a styrene butadiene rubber polymer. Examples of the solvent include N-methyl-pyrrolidone ("NMP"), N,N-d imethylformamide ("DMF"), N,N-dimethylacetamide ("DMA"), dimethylsulfoxide ("DMSO"), dichloromethane, chloroform, toluene, chlorobenzene, methyl acetate, ethyl acetate, γ-butyrolactone, acetone, methyl ethyl ketone, cyclohexanone, ether, 1,2-dimethoxyethane ("DME"), 1,2-diethoxyethane ("DEE"), tetrahydrofurane ("THF"), 2-methyltetrahydrofurane ("2-Methyl-THF"), 1,4-dioxane, a chain-type carbonate (such as dimethyl carbonate, ethyl methyl carbonate, diethyl carbonate, and dipropyl carbonate), a cyclic carbonate (such as ethylene carbonate, propylene carbonate, and butylene carbonate), methanol, ethanol, and water, but are not limited thereto. A combination comprising at least one of the foregoing solvents can also be used. Any suitable material available as a binder in the art may be used.

The cathode may include a second cathode active material in addition to the above-mentioned cathode active material. The second cathode active material may include any suitable material available as a cathode in the art, with the cathode being capable of lithium ion insertion and deintercalation. The second cathode active material may include at least one metal selected from cobalt, manganese, nickel, and a combination thereof, or a lithium composite oxide. Examples of the second cathode include $LiCoO_2$, $LiMn_xO_{2x}$ (x=1, 2), $LiNi_{1-x}Mn_xO_{2x}$ (0<x<1), $LiNi_{1-x-y}Co_xMn_yO_2$ (0≤x≤0.5, 0≤y≤0.5), $FePO_4$, or the like.

The lithium metal oxide composite may comprise a coating layer on a surface thereof and may comprise a mixture of the lithium metal oxide composite and a compound of the coating layer. The coating layer may include an oxide, hydroxide, oxyhydroxide, oxycarbonate, or hydroxycarbonate. The coating layer may be amorphous or crystalline. Examples of elements included in the coating layer include at least one selected from Mg, Al, Co, K, Na, Ca, Si, Ti, V, Sn, Ge, Ga, B, As, and Zr. The coating layer may be formed using any suitable process that does not adversely affect cathode active material characteristics, and may comprise spray coating, dipping, and the like. Detailed description of the coating methods that can be determined by those of ordinary skill in the art without undue experimentation and thus will be omitted herein.

If desired, a plasticizer may be further added in the cathode active material composition to form pores inside the electrode plate. Suitable amounts of the cathode active material, the conducting agent, the binder, and the solvent for a lithium battery can be determined by one of ordinary skill in the art without undue experimentation.

A lithium battery according to another embodiment includes a cathode including the cathode active material described above; an anode, and an electrolyte, disposed between the cathode and the anode. The lithium battery may be manufactured as follows.

First, a cathode is manufactured using the manufacturing method of the cathode described above.

Next, an anode is manufactured in the same manner as the cathode described above, except that an anode active material is used instead of the cathode active material.

That is, as described above, an anode active material, a conducting agent, a binder, and a solvent are mixed to prepare an anode active material composition. The anode active material composition may be directly coated on a copper current collector to manufacture an anode plate. Alternatively, the anode active material composition may be cast on a separate support to form an anode active material film, and then the anode active material film may be separated from the support and laminated on a copper current collector to manufacture an anode plate.

Examples of the anode active materials include lithium metal, a metal material capable of alloying with lithium, a transition metal oxide, a material capable of doping and de-doping, e.g., alloying and de-alloying, lithium, a material capable of reversibly inserting and deintercalating lithium ions, or the like.

Examples of the metal material capable of alloying with lithium include at least one selected from Si, Sn, Al, Ge, Pb, Bi, Sb, Si—Y alloy (where Y is an alkali metal, an alkali earth metal, an element of Groups 13 to 16, a transition metal, a rare earth element, or a combination thereof, except Si), Sn—Y alloy (where Y is an alkali metal, an alkali earth metal, an element of Groups 13 to 16, a transition metal, a rare earth element, or a combination thereof, except Sn), and the like. Examples of Y include at least one selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, and Po.

Examples of the transition metal oxide include vanadium oxide, lithium-vanadium oxide, or the like, and examples of the material capable of doping and de-doping lithium include at least one selected from Si, $SiO_x$ (where $0<x<2$), Si—Y alloy (where Y is an alkali metal, an alkali earth metal, an element of Groups 13 to 16, a transition metal, a rare earth element, or a combination thereof, except Si), Sn, $SnO_2$, Sn—Y (where Y is an alkali metal, an alkali earth metal, an element of Groups 13 to 16, a transition metal, a rare earth element, or a combination thereof, except Sn), and $SiO_2$. Examples of Y include at least one selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, and Po.

The material capable of reversibly inserting and deintercalating lithium ions may be a carbonaceous material, i.e., any carbon-based anode active material that is suitable for a lithium ion secondary battery. Examples of the material capable of reversibly inserting and deintercalating lithium ions include at least one selected from crystalline carbon, and amorphous carbon. The crystalline carbon may be natural or artificial graphite in amorphous, plate, flake, spherical, or fiber type. The amorphous carbon may include soft carbon (low-temperature sintering carbon) or hard carbon, mesophase pitch carbide, sintered coke, or the like.

However, examples of the anode active material are not limited thereto, and any suitable material that is capable of inserting and deintercalating lithium and available as an anode active material in the art may be used.

In the anode active material composition, the conducting agent, the binder, and the solvent may be the same as those used in the cathode active material composition. If desired, a plasticizer may be further included in the cathode active material composition and in the anode active material composition to form pores inside the electrode plates.

The amounts of the anode active material, the conducting agent, the binder, and the solvent may be determined by one of ordinary skill in the art without undue experimentation. Depending on a configuration and usage of the lithium battery, at least one of the conducting agents, the binder, and the solvent may be omitted.

Next, a separator to be interposed between the cathode and the anode is provided or prepared. The separator may be any one of various suitable separators used in a lithium battery. The separator may have low resistance to ion migration in an electrolyte and have an excellent electrolyte-retaining capability. Examples of the separator include at least one selected from glass fiber, polyester, Teflon, polyethylene, polypropylene, and polytetrafluoroethylene ("PTFE"), each of which may be a non-woven or woven fabric. For example, a windable separator including polyethylene or polypropylene may be used for a lithium ion battery. A separator with excellent organic electrolytic solution-retaining capability may be used for a lithium ion polymer battery. For example, the separator may be manufactured as follows.

A polymer resin, a filler and a solvent are mixed to prepare a separator composition. Then, the separator composition may be directly coated on an electrode and then dried to form the separator. Alternatively, the separator composition may be cast on a support and then dried to form a separator film, and the separator film, which is separated from the support, may be laminated on an electrode to form the separator.

The polymer resin that may be used to manufacture the separator may be any suitable material that is used as a binder for electrode plates. Examples of the polymer resin include at least one selected from a vinylidenefluoride/hexafluoropropylene copolymer; and polyvinylidene fluoride ("PVDF"), polyacrylonitrile, and polymethylmethacrylate.

Next, an electrolyte is prepared.

The electrolyte may be an organic electrolyte solution. Alternatively, the electrolyte may be a solid. Examples of the solid electrolyte include boron oxide and lithium oxynitride, but are not limited thereto. The solid electrolyte may be any suitable solid electrolyte used in the art. The solid electrolyte may be formed on the anode by, for example, sputtering.

For example, an organic electrolytic solution may be prepared. The organic electrolytic solution may be prepared by dissolving a lithium salt in an organic solvent.

The organic solvent may be any suitable organic solvent used in the art. Examples of the organic solvent include at least one selected from propylenecarbonate, ethylenecarbonate, fluoroethylenecarbonate, butylenecarbonate, dimethylcarbonate, diethylcarbonate, methylethylcarbonate, methylpropylcarbonate, ethylpropylcarbonate, methylisopropylcarbonate, dipropylcarbonate, dibutylcarbonate, benzonitrile, acetonitrile, tetrahydrofurane, 2-methyltetrahydrofurane, γ-butyrolactone, 1,3-dioxolane, 4-methyl-1,3-dioxolane, N,N-dimethylformamide, N,N-dimethylacetamide, dimethylsulfoxide, 1,4-dioxane, 1,2-dimethoxyethane, sulfolane, dichloroethane, chlorobenzene, nitrobenzene, diethyleneglycol, and dimethylether.

The lithium salt may be any suitable lithium salt used in the art. Examples of the lithium salt include at least one selected from LiPF$_6$, LiBF$_4$, LiSbF$_6$, LiAsF$_6$, LiClO$_4$, LiCF$_3$SO$_3$, Li(CF$_3$SO$_2$)$_2$N, LiC$_4$F$_9$SO$_3$, LiAlO$_2$, LiAlCl$_4$, LiN(C$_x$F$_{2x+1}$SO$_2$)(C$_y$F$_{2y+1}$SO$_2$) (where each of x and y is a natural number), LiCl, and LiI.

Figure 8:
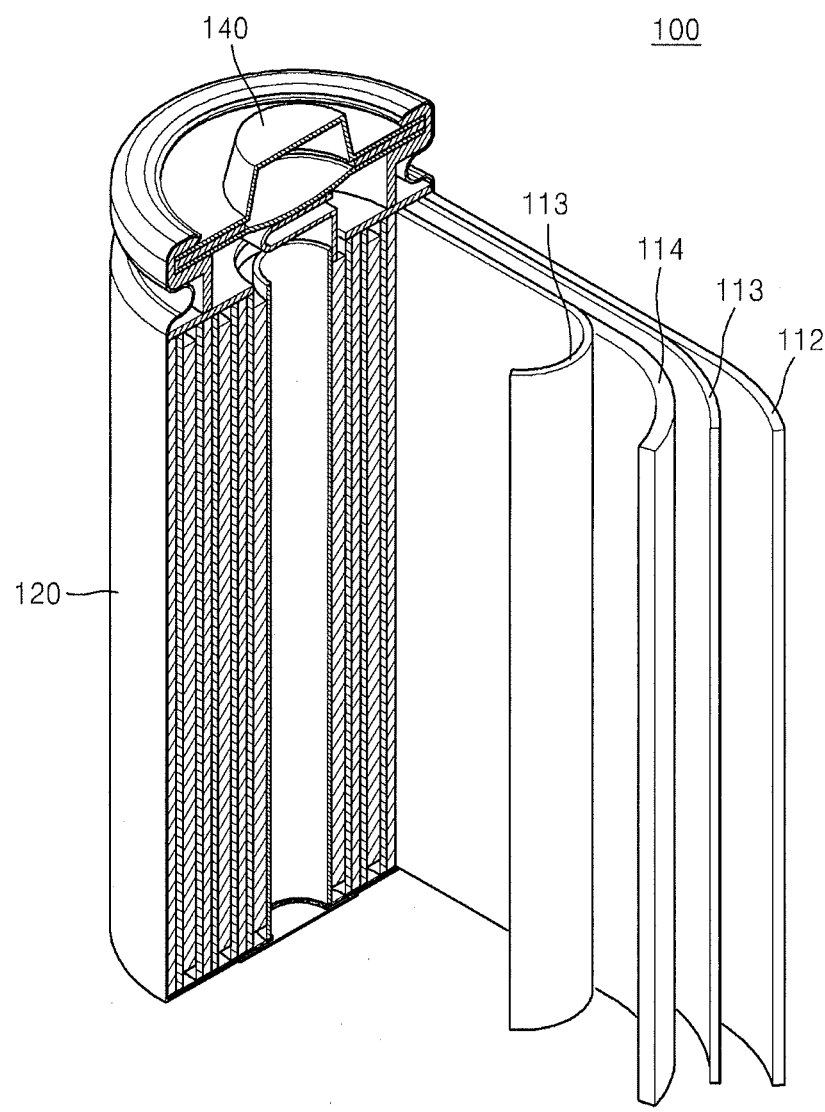
FIG. 8 is an exploded perspective view of an embodiment of a lithium battery.

As illustrated in FIG. 8, a lithium battery 100 includes a cathode 114, an anode 112, and a separator 113. The above-mentioned cathode 114, the anode 112, and the separators 113 are wound or folded to be housed in a battery case 120. Then, an organic electrolytic solution is injected into the battery case 120 and the resulting structure is sealed with a cap assembly 140, thereby completely manufacturing the lithium battery 100. The battery case 120 may have a cylindrical, rectangular, or thin-film form. For example, the lithium battery 100 may be a large thin-film type battery. The lithium battery 100 may be a lithium ion battery.

Also, a battery assembly may be formed by interposing the separator 113 between the cathode 114 and the anode 112. A plurality of the battery assembly may be stacked in a bi-cell structure and then impregnated with an organic electrolytic solution. The resulting structure is housed in a pouch and sealed, completing the manufacturing of a lithium ion polymer battery.

In addition, several of the above battery assemblies may be stacked on top of one another to form a battery pack, and the battery pack may be used in high-capacity and high power output devices, such as a laptop, a smart phone, an electric vehicle ("EV"), etc.

Since the lithium battery has enhanced high-temperature storage stability, cycle life characteristics, and high-rate discharge characteristics, the lithium battery is suitable for use in an EV. For example, the lithium battery may be used in a hybrid vehicle such as a plug-in hybrid electric vehicle ("PHEV")

A method of preparing a lithium metal oxide composite including a first domain and a second domain according to an embodiment includes contacting a first lithium precursor, a transition metal precursor, and a metal dopant precursor to prepare a first mixture; firstly heat treating to prepare a first domain lithium metal oxide; contacting the first domain lithium metal oxide with a second lithium precursor and a metal precursor to prepare a second mixture, and secondly heat treating to prepare a second lithium metal oxide to prepare the lithium metal oxide composite, wherein the lithium metal oxide composite is represented by Formula 1,

$$x[Li_{2-y}(M1)_{1-z}(M2)_{y+z}O_3]\text{-}(1-x)[LiMeO_2] \qquad \text{Formula 1}$$

wherein
0<x<1,
0≤y<1,
0≤z<1,
0<y+z<1,
M1 includes a transition metal,
M2 includes at least one metal selected from magnesium (Mg), aluminum (Al), vanadium (V), zinc (Zn), molybdenum (Mo), niobium (Nb), lanthanum (La), and ruthenium (Ru), and
Me includes at least one metal selected from nickel (Ni), cobalt (Co), manganese (Mn), iron (Fe), chromium (Cr), titanium (Ti), copper (Cu), aluminum (Al), magnesium (Mg), zirconium (Zr), and boron (B).

First, a first domain lithium metal oxide may be prepared.

In the method of preparing the first domain lithium metal oxide, the metal dopant precursor may be mixed simultaneously or sequentially with the first lithium precursor and the transition metal precursor. That is, in the method of preparing a first domain lithium metal oxide, the metal dopant precursor may be mixed with the first lithium precursor and the transition metal precursor at the same time, or the metal dopant precursor may be added after contacting the first lithium precursor and transition metal precursor.

The first and second lithium precursors may include at least one lithium salt selected from Li$_2$CO$_3$, LiOH, Li(CO$_2$)$_2$, LiCl, LiOCO$_2$CH$_3$, and LiF. The transition metal precursor may include at least one selected from MnCO$_3$, Mn(SO$_4$)$_2$, Mn(NO$_3$)$_2$, MnCl$_2$, MnBr$_2$, (CH$_3$CO$_2$)$_2$Mn, NiCO$_3$, NiSO$_4$, NiNO$_3$, NiCl$_2$, NiBr$_2$, (CH$_3$CO$_2$)$_2$Ni, CoCO$_3$, CoSO$_4$, Co(NO$_3$)$_2$, CoCl$_2$, CoBr$_2$, (CH$_3$CO$_2$)$_2$Co, FeCO$_3$, FeSO$_4$, Fe(NO$_3$)$_2$, Fe(NO$_3$)$_3$, FeCl$_2$, FeCl$_3$, FeBr$_2$, FeBr$_3$, (CH$_3$CO$_2$)$_2$Fe, CrCO$_3$, Cr(SO$_4$)$_2$, Cr(NO$_3$)$_2$, CrCl$_2$, CrBr$_2$, (CH$_3$CO$_2$)$_2$Cr, and a hydrate thereof. For example, the transition metal precursor may include at least one selected from MnCO$_3$, Mn(SO$_4$)$_2$, Mn(NO$_3$)$_2$, MnCl$_2$, MnBr$_2$, (CH$_3$CO$_2$)$_2$Mn, and a hydrate thereof.

The metal dopant precursor may include at least one selected from Al$_2$O$_3$, MgO, V$_2$O$_5$, VO$_2$, V$_2$O$_3$, VO, V$_2$O$_5$, ZnO, MoO$_3$, Nb$_2$O$_3$, La$_2$O$_3$, and RuO$_2$.

An amount of the metal dopant precursor may be about 0.01 mole percent (mol %) to about 0.5 mol %, based on the total moles of the first lithium precursor and the transition metal precursor. For example, the amount of the metal dopant precursor may be about 0.01 mol % to about 0.2 mol %, based on the total moles of the first lithium precursor and the transition metal precursor. When an amount of the metal dopant precursor is included in an amount within the above ranges, the structural stability of the lithium metal oxide composite of Formula 1 may be improved.

The first thermal treatment may be initiated at least once at a temperature of about 400° C. to about 800° C. For example, the first thermal treatment may be initiated twice at a temperature of about 500° C. to about 700° C. for about 1 hour to about 12 hours per application of the first thermal treatment. Due to the first thermal treatment, Li and/or some of the M1 transition metals included in the first Li$_2$(M1)O$_3$ domain may be selectively doped by the second metal M2.

Then, a lithium metal oxide composite represented by Formula 1 and including the first domain lithium metal oxide and the second domain lithium metal oxide may be prepared by mixing the first domain lithium metal oxide with a second lithium precursor and a metal precursor to prepare a mixture, and a second treatment may be provided.

The metal precursor may include at least one selected from NiCO$_3$, Ni(SO$_4$)$_2$, Ni(NO$_3$)$_2$, NiCl$_2$, NiBr$_2$, (CH$_3$CO$_2$)$_2$Ni, MnCO$_3$, Mn(SO$_4$)$_2$, Mn(NO$_3$)$_2$, MnCl$_2$, MnBr$_2$, (CH$_3$CO$_2$)$_2$Mn, CoCO$_3$, Co(SO$_4$)$_2$, Co(NO$_3$)$_2$, CoCl$_2$, CoBr$_2$, (CH$_3$CO$_2$)$_2$Co, FeCO$_3$, FeSO$_4$, Fe(NO$_3$)$_2$, Fe(NO$_3$)$_3$, FeCl$_2$, FeCl$_3$, FeBr$_2$, FeBr$_3$, (CH$_3$CO$_2$)$_2$Fe, CrCO$_3$, Cr(SO$_4$)$_2$, Cr(NO$_3$)$_2$, CrCl$_2$, CrBr$_2$, (CH$_3$CO$_2$)$_2$Cr, TiCO$_3$, Ti(SO$_4$)$_2$, Ti(NO$_3$)$_2$, TiCl$_2$, TiBr$_2$, CuCO$_3$, CuSO$_4$, Cu(NO$_3$)$_2$, CuCl$_2$, CuBr$_2$, (CH$_3$CO$_2$)$_2$Cu, AlCO$_3$, Al(SO$_4$)$_3$, Al(NO$_3$)$_3$, AlCl$_3$, AlBr$_3$, (CH$_3$CO$_2$)$_3$Al, MgCO$_3$, MgSO$_4$, Mg(NO$_3$)$_2$, MgCl, MgBr, (CH$_3$CO$_2$)$_2$Mg, Zr(CO$_3$)$_2$, Zr(SO$_4$)$_2$, Zr(NO$_3$)$_2$, ZrCl$_4$, ZrBr$_4$, B$_2$(CO$_3$)$_3$, B$_2$(SO$_4$)$_3$, B(NO$_3$)$_3$, BCl$_3$, BBr$_3$, and a hydrate thereof. For example, the metal precursor may include NiCO$_3$, Ni(SO$_4$)$_2$, Ni(NO$_3$)$_2$, NiCl$_2$, NiBr$_2$, (CH$_3$CO$_2$)$_2$Ni, MnCO$_3$, Mn(SO$_4$)$_2$, Mn(NO$_3$)$_2$, MnCl$_2$, MnBr$_2$, (CH$_3$CO$_2$)$_2$Mn, CoCO$_3$, Co(SO$_4$)$_2$, Co(NO$_3$)$_2$, CoCl$_2$, CoBr$_2$, (CH$_3$CO$_2$)$_2$Co, and a hydrate thereof.

The metal precursor may be manufactured by a coprecipitation method. For example, the metal precursor may include NiCoMn(OH)$_2$. The metal precursor may be manufactured using nickel salt, cobalt salt, and manganese salt with an alkaline aqueous solution such as lithium hydroxide (LiOH), sodium hydroxide (NaOH), potassium hydroxide (KOH), and aqueous ammonium hydroxide ($NH_4OH$) as a pH adjuster.

The metal precursor may be manufactured using a coprecipitation method and using the first domain lithium metal oxide. That is, the first domain lithium metal oxide may be mixed during the coprecipitation process. In this way, the cathode active material may be produced in a large scale.

The second thermal treatment may be performed at a temperature of about 700° C. to about 950° C. for about 5 hours to about 20 hours. The second thermal treatment may be performed over a short period of time and thus is easy to be performed.

The methods of preparing the first domain lithium metal oxide and preparing the lithium metal oxide composite represented by Formula 1 including a first domain lithium metal oxide and a second domain lithium metal oxide may include a mechanical milling process such as ball milling. The mechanical milling process may be any one of various suitable milling types available in the art. The mechanical milling process may provide a more uniform particle size or shape, and a more regular crystalline structure. That is, in the method of preparing the first domain lithium metal oxide, the lithium precursor, the transition metal precursor, and the metal precursor may be mixed as starting materials and then ground. In the method of preparing the lithium metal oxide composite represented by Formula 1, the lithium precursor and the metal precursor may be mixed and then ground. The mechanical milling process may be performed within the range of about 1 hour to about 5 hours.

Hereinafter, an embodiment will be described in further detail with reference to the following examples. However, these examples shall not limit the scope of the disclosed embodiments.

Preparation of Cathode Active Material

Example 1

$0.5[Li_{1.9375}MnAl_{0.0625}O_3]$-$0.5[Li(Ni_{0.33}Co_{0.33}Mn_{0.33})O_2]$ Cathode Active Material: Cathode Active Materials of which Only First Domain Lithium Metal Oxides are Doped by a Metal A first lithium precursor ($Li_2CO_3$), a transition metal precursor ($MnCO_3$), and a metal dopant precursor ($Al_2O_3$) were used as starting materials. In order to prepare a first domain lithium metal oxide ($0.5[Li_{1.9375}MnAl_{0.0625}O_3]$), the starting materials were prepared based on a mole ratio of Li:Mn:Al.

The starting materials were mixed and then ground with grinding media, i.e., balls, in a grinding container for about 1 hour. The ground mixture underwent a first thermal treatment in a furnace, in which dry air was supplied thereto at a temperature of 600° C. for about 12 hours and at a temperature of 800° C. for about 12 hours, to prepare the first domain lithium metal oxide (0.5 $[Li_{1.9375}MnAl_{0.0625}O_3]$).

The metal precursor $NiCoMn(OH)_2$ was prepared by using a coprecipitation method at a temperature of about 60° C., using $Ni(SO_4)_2$, $Co(SO_4)_2$, $Mn(SO_4)_2$ and a pH adjuster, i.e., $(NH_4)OH$ in deionized water.

In order to prepare the second domain lithium metal oxide ($0.5[Li(Ni_{0.33}Co_{0.33}Mn_{0.33})O_2]$), the second lithium precursor ($Li_2CO_3$) and the metal precursor ($NiCoMn(OH)_2$) were mixed with the first domain lithium metal oxide and with balls, followed by grinding of the mixture in a grinding container for about 1 hour based on a mole ratio of Li:Ni:Co:Mn.

The ground mixture underwent a second thermal treatment in a furnace, in which dry air was supplied thereto at a temperature of 900° C. for about 10 hours, to prepare the cathode active material having a composite domain including the first domain lithium metal oxide and the second domain lithium metal oxide. The cathode active material was cooled in the furnace.

Example 2

$0.5[Li_{1.875}MnAl_{0.125}O_3]$-$0.5[Li(Ni_{0.33}Co_{0.33}Mn_{0.33})O_2]$ Cathode Active Material: Cathode Active Materials of which Only First Domain Lithium Metal Oxides are Doped by a Metal A composite cathode active material including the first domain lithium metal oxide and the second domain lithium metal oxide was prepared in the same manner as in Example 1, except for using the starting materials prepared based on a mole ratio of Li:Mn:Al to prepare the first domain lithium metal oxide ($0.5[Li_{1.875}MnAl_{0.125}O_3]$) instead of using the starting materials prepared based on a mole ratio of Li:Mn:Al to prepare the first domain lithium metal oxide (0.5 $[Li_{1.9375}MnAl_{0.0625}O_3]$).

Example 3

$0.5[Li_{1.75}MnAl_{0.25}O_3]$-$0.5[Li(Ni_{0.33}Co_{0.33}Mn_{0.33})O_2]$ Cathode Active Material: Cathode Active Materials of which Only First Domain Lithium Metal Oxides are Doped by a Metal A composite cathode active material including the first domain lithium metal oxide and the second domain lithium metal oxide was prepared in the same manner as in Example 1, except for using the starting materials prepared based on a mole ratio of Li:Mn:Al to prepare the first domain lithium metal oxide ($0.5[Li_{1.75}MnAl_{0.25}O_3]$) instead of using the starting materials were prepared based on a mole ratio of Li:Mn:Al to prepare the first domain lithium metal oxide ($0.5[Li_{1.9375}MnAl_{0.0625}O_3]$).

Example 4

$0.5[Li_2Mn_{0.9375}V_{0.0625}O_3]$-$0.5[Li(Ni_{0.33}Co_{0.33}Mn_{0.33})O_2]$ Cathode Active Material: Cathode Active Materials of which Only First Domain Lithium Metal Oxides are Doped by a Metal A first lithium precursor ($Li_2CO_3$), a transition metal precursor ($MnCO_3$), and a metal dopant precursor ($V_2O_5$) were used as starting materials. In order to prepare a first domain lithium metal oxide ($0.5[Li_2Mn_{0.9375}V_{0.0625}O_3]$), the starting materials were prepared based on a mole ratio of Li:Mn:V.

The starting materials were mixed and then ground with balls in a grinding container for about 1 hour. The ground mixture underwent a first thermal treatment in a furnace, in which dry air was supplied thereto at a temperature of 600° C. for about 12 hours and at a temperature of 800° C. for about 12 hours, to prepare the first domain lithium metal oxide ($0.5[Li_2Mn_{0.9375}V_{0.0625}O_3]$).

A metal precursor NiCoMn(OH)$_2$ was prepared using a coprecipitation method at a temperature of about 60° C., using Ni(SO$_4$)$_2$, Co(SO$_4$)$_2$, Mn(SO$_4$)$_2$, and pH adjuster, i.e., (NH$_4$)OH, in a deionized water.

In order to prepare the second domain lithium metal oxide 0.5[Li(Ni$_{0.33}$Co$_{0.33}$Mn$_{0.33}$)O$_2$], the second lithium precursor (Li$_2$CO$_3$) and the metal precursor (NiCoMn(OH)$_2$) were mixed with the first domain lithium metal oxide and with balls, followed by grinding of the mixture in a grinding container for about 1 hour based on a mole ratio of Li:Ni:Co:Mn.

The ground mixture underwent a second thermal treatment in a furnace, in which dry air was supplied thereto at a temperature of 900° C. for about 10 hours, to prepare the cathode active material having a composite domain including the first domain lithium metal oxide and the second domain lithium metal oxide. The cathode active material was cooled in the furnace.

Example 5

0.5[Li$_2$Mn$_{0.875}$V$_{0.125}$O$_3$]-0.5[Li(Ni$_{0.33}$Co$_{0.33}$Mn$_{0.33}$)O$_2$] Cathode Active Material: Cathode Active Materials of which Only First Domain Lithium Metal Oxides are Doped by a Metal A first lithium precursor (Li$_2$CO$_3$), a transition metal precursor (MnCO$_3$), and a metal dopant precursor (V$_2$O$_5$) were used as starting materials. In order to prepare a first domain lithium metal oxide (0.5[Li$_2$Mn$_{0.875}$V$_{0.125}$O$_3$]), the starting materials were prepared based on a mole ratio of Li:Mn:V.

The starting materials were mixed and then ground with balls in a grinding container for about 1 hour. The ground mixture performed a first thermal treatment in a furnace, in which dry air was supplied thereto at a temperature of 600° C. for about 12 hours and at a temperature of 800° C. for about 12 hours, to prepare the first domain lithium metal oxide (0.5[Li$_2$Mn$_{0.875}$V$_{0.125}$O$_3$]).

A metal precursor NiCoMn(OH)$_2$ was prepared using a coprecipitation method at a temperature of about 60° C., using Ni(SO$_4$)$_2$, Co(SO$_4$)$_2$, Mn(SO$_4$)$_2$, and a pH adjuster, i.e., (NH$_4$)OH, in a deionized water.

In order to prepare the second domain lithium metal oxide 0.5[Li(Ni$_{0.33}$Co$_{0.33}$Mn$_{0.33}$)O$_2$], the second lithium precursor (Li$_2$CO$_3$) and the metal precursor (NiCoMn(OH)$_2$) were mixed with the first domain lithium metal oxide and with balls, followed by grinding of the mixture in a grinding container for about 1 hour based on a mole ratio of Li:Ni:Co:Mn.

The ground mixture underwent a second thermal treatment in a furnace, in which dry air was supplied thereto at a temperature of 900° C. for about 10 hours, to prepare the composite cathode active material including the first domain lithium metal oxide and the second domain lithium metal oxide. The cathode active material was cooled in the furnace.

Example 6

0.5[Li$_2$Mn$_{0.9375}$La$_{0.0625}$O$_3$]-0.5[Li(Ni$_{0.33}$Co$_{0.33}$Mn$_{0.33}$)O$_2$] Cathode Active Material: Cathode Active Materials of which Only First Domain Lithium Metal Oxides are Doped by a Metal A first lithium precursor (Li$_2$CO$_3$), a transition metal precursor (MnCO$_3$), and a metal dopant precursor (La$_2$O$_3$) were used as starting materials. In order to prepare a first domain lithium metal oxide (0.5[Li$_2$Mn$_{0.9375}$La$_{0.0625}$O$_3$]), the starting materials were prepared based on a mole ratio of Li:Mn:La.

The starting materials were mixed with balls and then ground in a grinding container for about 1 hour. The ground mixture underwent a first thermal treatment in a furnace, in which dry air was supplied thereto at a temperature of 600° C. for about 12 hours and at a temperature of 800° C. for about 12 hours, to prepare the first domain lithium metal oxide ([Li$_2$Mn$_{0.9375}$La$_{0.0625}$O$_3$]).

A metal precursor NiCoMn(OH)$_2$ was prepared by using a coprecipitation method at a temperature of about 60° C., using Ni(SO$_4$)$_2$, Co(SO$_4$)$_2$, Mn(SO$_4$)$_2$, and pH control agent, i.e., (NH$_4$)OH, in a deionized water.

In order to prepare the second domain lithium metal oxide 0.5[Li(Ni$_{0.33}$Co$_{0.33}$Mn$_{0.33}$)O$_2$], the second lithium precursor (Li$_2$CO$_3$) and the metal precursor (NiCoMn(OH)$_2$) were mixed with the first domain lithium metal oxide and with balls, followed by grinding of the mixture in a grinding container for about 1 hour based on a mole ratio of Li:Ni:Co:Mn.

The ground mixture underwent a second thermal treatment in a furnace, in which dry air was supplied thereto at a temperature of 900° C. for about 10 hours, to prepare the cathode active material having a composite domain including the first domain lithium metal oxide and the second domain lithium metal oxide. The cathode active material was cooled in the furnace.

Comparative Example 1

0.5[Li$_2$MnO$_3$]-0.5[Li(Ni$_{0.33}$Co$_{0.33}$Mn$_{0.33}$)O$_2$] Cathode Active Material: Cathode Active Material of which None of the First and Second Domain Lithium Metal Oxides are Doped by a Metal A first lithium precursor (Li$_2$CO$_3$) and a transition metal precursor (MnCO$_3$) were used as starting materials. In order to prepare a first domain lithium metal oxide (0.5[Li$_2$MnO$_3$]), the starting materials were prepared based on a mole ratio of Li:Mn.

The starting materials were mixed and then ground with balls in a grinding container for about 1 hour. The ground mixture underwent a first thermal treatment in a furnace, in which dry air was supplied thereto at a temperature of 600° C. for about 12 hours and at a temperature of 800° C. for about 12 hours, to prepare the first domain lithium metal oxide (0.5[Li$_2$MnO$_3$]).

A metal precursor NiCoMn(OH)$_2$ was prepared by using a coprecipitation method at a temperature of about 60° C., using Ni(SO$_4$)$_2$, Co(SO$_4$)$_2$, Mn(SO$_4$)$_2$, and a pH adjuster, i.e., (NH$_4$)OH, in a deionized water.

In order to prepare the second lithium metal oxide (0.5[Li(Ni$_{0.33}$Co$_{0.33}$Mn$_{0.33}$)O$_2$]), the lithium precursor (Li$_2$CO$_3$) and the metal precursor (NiCoMn(OH)$_2$) were mixed with the first domain lithium metal oxide and with balls, followed by grinding of the mixture in a grinding container for about 1 hour based on a mole ratio of Li:Ni:Co:Mn.

The ground mixture underwent a second thermal treatment in a furnace, in which dry air was supplied thereto at a temperature of 900° C. for about 10 hours, to prepare the cathode active material having a composite domain including the first domain lithium metal oxide and the second domain lithium metal oxide. The cathode active material was cooled in the furnace.

Comparative Example 2

$0.5[Li_{2-p}MnAl_pO_3]-0.5[Li_{1-q}Al_q(Ni_{0.33}Co_{0.33}Mn_{0.33})O_2]$ (where, p+q=0.0625, p≠0, q≠0) Cathode Active Material: Cathode Active Material of which Both First and Second Domain Lithium Metal Oxides is Doped by a Metal A metal precursor $NiCoMn(OH)_2$ was prepared by using a coprecipitation method at a temperature of about 60° C., using $Ni(SO_4)_2$, $Co(SO_4)_2$, $Mn(SO_4)_2$, and a pH adjuster, i.e., $(NH_4)OH$, in a deionized water.

In order to prepare a cathode active material $((0.5[Li_{2-p}MnAl_pO_3]-0.5[Li_{1-q}Al_q(Ni_{0.33}Co_{0.33}Mn_{0.33})O_2]$ (where, p+q=0.0625, p≠0, q≠0)), a lithium precursor $Li_2CO_3$, the metal precursor $(NiCoMn(OH)_2)$, and a metal dopant precursor $Al_2O_3$ were prepared based on a mole ratio of Li:Ni:Co:Mn:Al, and the mixture was mixed and then ground with balls in a grinding container for about 1 hour.

The ground mixture underwent a second thermal treatment in a furnace, in which dry air was supplied thereto at a temperature of 900° C. for about 10 hours, to prepare the composite cathode active material including the first domain lithium metal oxide and the second domain lithium metal oxide. The cathode active material was cooled in the furnace.

Comparative Example 3

$0.5[Li_{2-p}MnAl_pO_3]-0.5[Li_{1-q}Al_q(Ni_{0.33}Co_{0.33}Mn_{0.33})O_2]$ (where, p+q=0.125, p≠0, q≠0) Cathode Active Material: Cathode Active Material of which Both First and Second Domain Lithium Metal Oxides is Doped by a Metal A metal precursor $NiCoMn(OH)_2$ was prepared by using a coprecipitation method at a temperature of about 60° C., using $Ni(SO_4)_2$, $Co(SO_4)_2$, $Mn(SO_4)_2$, and a pH adjuster, i.e., $(NH_4)OH$, in a deionized water.

In order to prepare a cathode active material $((0.5[Li_{2-p}MnAl_pO_3]-0.5[Li_{1-q}Al_q(Ni_{0.33}Co_{0.33}Mn_{0.33})O_2]$ (where, p+q=0.0625, p≠0, q≠0)), a lithium precursor $Li_2CO_3$, the metal precursor $(NiCoMn(OH)_2)$, and a metal dopant precursor $Al_2O_3$ were prepared based on a mole ratio of Li:Ni:Co:Mn:Al, and the mixture was mixed and then ground with balls in a grinding container for about 1 hour.

The ground mixture underwent a second thermal treatment in a furnace, in which dry air was supplied thereto at a temperature of 900° C. for about 10 hours, to prepare the cathode active material having a composite domain including the first domain lithium metal oxide and the second domain lithium metal oxide. The cathode active material was cooled in the furnace.

Manufacture of Cathode and Lithium Battery

Example 7

The cathode active material power prepared according to Example 1 and a carbonaceous conducting agent (Carbon Black, Super P®, Timcal Graphite & Carbon) were uniformly mixed in a weight ratio of 86:8, and then an N-methylpyrrolidone ("NMP") solution including polyvinylidene fluoride ("PVDF") binder solution was added thereto to prepare a slurry containing the cathode active material, the carbonaceous conducting agent, and the binder in a weight ratio of 86:8:6.

The slurry was coated on 15 micrometer (μm)-thick aluminum foil to a thickness of 200 μm using a doctor blade, and then dried. Then, the slurry was further dried in a vacuum to prepare a cathode plate at a temperature of 120° C. The cathode plate was prepared in the form of a sheet by roll press. The cathode plate had dimensions suitable for a coin cell (CR2032 type) having a diameter of 12 millimeters (mm).

In the coin cell manufacturing process, metal lithium was used as a counter electrode, and a solution was prepared by dissolving 1.3M $LiPF_6$ in a mixed solvent of ethylene carbonate ("EC"), diethyl carbonate ("DEC"), and ethyl methyl carbonate ("EMC") at a volume ratio of 3:5:2.

Examples 8 to 12

A lithium battery was manufactured in the same manner as in Example 9, except that the cathode active material prepared according to Examples 2 to 6 were respectively used instead of using the cathode active material prepared according to Example 1.

Comparative Examples 4 to 6

A lithium battery was manufactured in the same manner as in Example 9, except that the cathode active materials prepared according to Comparative Examples 1 to 3 were respectively used instead of using the cathode active material prepared according to Example 1.

Analysis of Cathode Active Material

Analysis Example 1

Pattern Decomposition

A lattice constant c, referring to a length of c-axis of the cathode active material in Example 1, 2, and Comparative Example 1, was analyzed by using a Pawley refinement method for pattern decomposition. Data was measured using CuKa at an angle in a range of 5° to about 145° 2θ at a voltage of 40 kiloVolts ("kV"), a constant current of 40 milliAmpere ("mA"), and a Step scan mode. Data was sampled at an interval of 10 s/0.02°, and the results are shown in Table 1.

TABLE 1

|  | Length of c-axis (Å) |
|---|---|
| Example 1 | 14.2409 |
| Example 2 | 14.2435 |
| Comparative Example 1 | 14.2328 |

Referring to Table 1, the lattice constant c, or the length of c-axis of the cathode active materials in Examples 1 and 2, is more than 14.24 Å. The length of c-axis of the cathode active material in Comparative Example 1 is within a range of about 14.23 Å.

Thus, it was confirmed that the lengths of c-axis of the cathode active materials in Examples 1 and 2 are increased in comparison with the length of x-axis of the cathode active material in Comparative Example 1.

Analysis Example 2

X-Ray Diffraction (XRD) Test (1) A Scattering Angle of a Peak Corresponding the 108 Plane and a Separation Distance Between Two Peaks Each Corresponding the 108 Plane and the 110 Plane XRD analysis was performed on the surface of each of the cathode active materials prepared according to Examples 1, 2, and Comparative Example 1. The results are shown in FIGS. 1 and 2. The XRD was performed using a Cu—Kα ray.

As shown in FIG. 1, regarding the cathode active material prepared according to Examples 1 and 2, a peak corresponding to the 108 plane is at a smaller scattering angle than the cathode active material prepared according to Comparative Example 1. Thus, it was confirmed that the length of c-axis of the cathode active materials in Examples 1 and 2 are increased in comparison with the length of c-axis of the cathode active material in Comparative Example 1.

As shown in FIG. 2, regarding the cathode active materials of Examples 1, 2, and Comparative Example 1, the peaks corresponding to the 108 plane and the 110 plane have a scattering angle in a range of about 64.5°±0.5° 2θ to about 65.5°±0.5° 2θ.

In the cathode active materials of Examples 1, 2, and Comparative Example 1, it was confirmed that the separation distance between the peaks corresponding to the 108 plane and the 110 plane were in a range of about 0.9° to about 0.93° for Examples 1, 2, and about 0.89° for Comparative Example 1.

Thus, regarding the cathode active materials in Examples 1 and 2, it was confirmed that the separation distance between the peaks corresponding to the 108 plane and the 110 plane are increased in comparison with the separation length in Comparative Example 1.

(2) Peak Intensity Ratio ($I_{(003)}/I_{(104)}$) and Size of Crystalline Particles Regarding the cathode active materials of Examples 1, 2, and Comparative Example 1, a peak intensity ratio of a primary peak corresponding to 003 plane to a secondary peak corresponding to 104 plane ($I_{(003)}/I_{(104)}$), and a full width at half maximum ("FWHM") of the peaks are obtained from the XRD. The size of crystalline particles of the cathode active material was calculated based on Equation 1 (Scherrer's equation) below using the FWHM. The results are shown in FIG. 1 and Table 2.

$$t = K\lambda/\beta \cos\theta \quad \text{Equation 1}$$

(where, K (shape factor) is 0.9, λ (X-ray wavelength) is 1.5406 Å, and β is FWHM, and a θ (Bragg) is 9.25°)

TABLE 2

| | 003 plane | | |
|---|---|---|---|
| | Peak intensity ratio of ($I_{(003)}/I_{(104)}$) | FWHM | Size of crystalline particle (nm) |
| Example 1 | 1.8394 | 0.001112 | 126.974 |
| Example 2 | 1.9396 | 0.001016 | 138.965 |
| Comparative Example 1 | 1.3733 | 0.001845 | 76.5198 |

Regarding Table 2, it was confirmed that the peak intensity of $I_{(003)}/I_{(104)}$ of the composite cathode active materials in Examples 1 and 2 are increased in comparison with the peak intensity of $I_{(003)}/I_{(104)}$ of the cathode active material in Comparative Example 1. Additionally, it was confirmed that the size of crystalline particle determined by a FWHM of the peak corresponding to 003 plane are increased in comparison with the cathode active material in Comparative Example 1.

Therefore, it was confirmed that the composite cathode active materials prepared according to Examples 1 and 2 have increased structural stability in comparison with the cathode active material prepared according to Comparative Example 1, and thus the cathode active materials prepared according to Examples 1 and 2 may have improved cycle life characteristics via stable insertion and deintercalation of the lithium ions.

Analysis Example 3

X-Ray Photoelectron Spectroscopy (XPS) Test

Double-sided tape was attached on a metal plate, and a sample of the cathode active materials prepared according to Example 2 and Comparative Example 3 was sprinkled on the top of the metal plate sufficiently enough to cover the double-sided tape. Then, the metal plate having a planar surface was pressed onto a holder.

Each spectrum within a core level of Al2p (71-78 eV) was obtained by using XPS (Quantum2000 Scanning Microprobe, manufactured by ESCA) under the conditions of using a monochromatic Al—Kα ray (1486.6 eV, 27.7 W) as a light source, a 0.2 mm angle as a measurement area, and an output angle of 45°.

Accordingly, regarding the cathode active materials prepared according to Example 3 and Comparative Example 3, peaks having binding energy (eV) at 74.1 eV and 73.1 eV were analyzed by deconvolution. The results are shown in FIG. 3 and Table 3.

Ref. a in FIG. 3 and Table 3 represents the spectrum of the peak at 74.1 eV in the Al-doped first domain lithium metal oxide ($Li_{1.875}MnAl_{0.125}O_3$), and Ref. b therein represents the spectrum of the peak at 73.1 eV in the Al-doped second domain lithium metal oxide ($Li_{0.875}Al_{0.125}(Ni_{0.33}Co_{0.33}Mn_{0.33})O_2$).

TABLE 3

| | $Li_{1.875}MnAl_{0.125}O_3$ (74.1 eV) (atm %) | $Li_{0.875}Al_{0.125}(Ni_{0.33}Co_{0.33}Mn_{0.33})O_2$ (73.1 eV) (atm %) |
|---|---|---|
| Ref. a | 100 | — |
| Example 2 | 64.8 | 35.2 |
| Comparative Example 3 | 37.0 | 63.1 |
| Ref. b | — | 100 |

Referring to FIG. 3 and Table 3, a concentration of Al2p at 74.1 eV on the surface of the cathode active material prepared according to Example 2 is gradually increased as an amount of doped Al is increased, in which only the first domain lithium metal oxide is doped by Al. Also, a concentration of Al2p at 73.1 eV on the surface of the cathode active material prepared according to Example 2 is gradually decreased.

In addition, Ref. a represents a higher binding energy of Al—O than Ref. b. The binding energy of Al—O are increased in the cathode active material prepared according to Example 2 in comparison with the cathode active material prepared according to Comparative Example 3.

Thus, it was confirmed that the cathode active material prepared according to Example 2 was selectively doped by Al only on the first domain lithium metal oxide ($Li_2MnO_3$).

Analysis Example 4

NMR Analysis

The cathode active materials prepared according to Example 2 and Comparative Example 3 were analyzed by $^{27}Al$-NMR. In order to analyze the $^{27}Al$-NMR peak pattern of the cathode active materials prepared according to Example 2 and Comparative Example 3, $^{27}Al$-NMR peak patterns Ref. 1 of $Li_{1.875}MnAl_{0.125}O_3$ of Al-doped the first domain lithium metal oxide ($Li_2MnO_3$) and $^{27}Al$-NMR peak patterns Ref. 2 of $Li_{0.875}Al_{0.125}(Ni_{0.33}Co_{0.33}Mn_{0.33})O_2$ of Al-doped the second domain lithium metal oxide (Li($Ni_{0.33}Co_{0.33}Mn_{0.33}$)$O_2$) were used. The results are shown in FIG. 4.

Referring to FIG. 4, it was confirmed that the $^{27}Al$-NMR peak pattern of the cathode active material prepared according to Example 2 was similar to the $^{27}Al$-NMR peak pattern (Ref. 1) of the $Li_{1.875}MnAl_{0.125}O_3$ in which Al was doped on the first domain lithium metal oxide ($Li_2MnO_3$).

It was confirmed that the $^{27}Al$-NMR peak pattern of the cathode active material prepared according to Example 2 was different than the $^{27}Al$-NMR peak pattern of the cathode active material prepared according to Comparative Example 3, which was rather similar to the $^{27}Al$-NMR peak pattern (Ref. 2) of the $Li_{0.875}Al_{0.125}(Ni_{0.33}Co_{0.33}Mn_{0.33})O_2$ in which Al was doped on the second domain lithium metal oxide (Li($Ni_{0.33}Co_{0.33}Mn_{0.33}$)$O_2$).

Thus, it was confirmed that the cathode active material prepared according to Example 2 was selectively doped by Al only on the first domain lithium metal oxide.

Evaluation on Cycle Life Characteristics of a Battery

Evaluation Example 1

Voltage Drop

The lithium batteries prepared according to Examples 8, 9, and 12, and Comparative Examples 5 and 6 were charged and discharged twice at a temperature of 25° C. (formation process). The lithium batteries that had been subjected to the first formation process were charged with a constant current at a 0.1 C rate until their respective voltages reached 4.7 V, and then discharged with a constant current at a 0.1 C rate until their respective voltages reached 2.5 V.

The lithium batteries that had been subjected to the formation process were charged with a constant current at a 0.5 C rate until their respective voltages reached 4.7 V, and then discharged with a constant current at a 0.2 C rate until their respective voltages reached 2.5 V. The conditions of the charging and discharging and the conditions of the discharge capacities of the exemplary lithium batteries were standardized.

Subsequently, the lithium batteries were charged with a constant current at a 1 C rate in the form above, and then discharged with a constant current at a 1 C rate until their respective voltages reached 2.5 V. A discharge capacity (discharge capacity in the $1^{st}$ cycle) was measured. Such charging and discharging were repeatedly performed, and the discharge capacities of each of the charge and discharge cycles and the discharge capacity in the $100^{th}$ cycle were measured.

Figure 5:
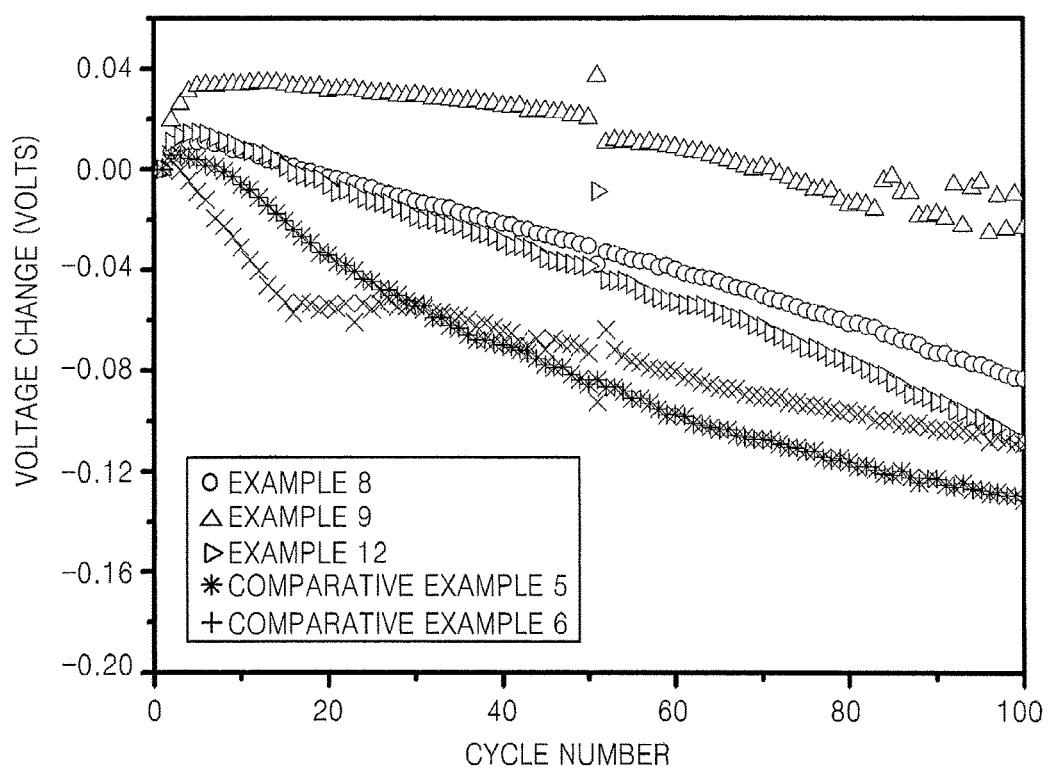
FIG. 5 is a graph of voltage change (volts, V) versus cycle number, and is a graphical view showing discharge voltage characteristics of lithium batteries prepared according to Examples 8, 9, and 12, and Comparative Examples 5 and 6.

Based on the measured discharge capacities, an average discharge voltage corresponding to a median value of the discharge capacity of respective cycles and an average discharge voltage corresponding to a median value of the discharge capacity of the $100^{th}$ cycle were measured. Then, discharge voltage drop was calculated by Equation 1 based on the average discharge voltage. The results are shown in FIG. 5 and Table 4.

Discharge voltage drop [mV]=[average discharge voltage in the $1^{st}$ cycle−average discharge voltage drop in the $100^{th}$ cycle]     Equation 1

TABLE 4

|  | Average discharge voltage in the $1^{st}$ cycle (V) | Average discharge voltage drop in the $100^{th}$ cycle (mV) |
| --- | --- | --- |
| Example 8 | 3.5886 | −0.0831 |
| Example 9 | 3.5721 | −0.0235 |
| Example 12 | 3.5285 | −0.1084 |
| Comparative Example 5 | 3.5716 | −0.1090 |
| Comparative Example 6 | 3.5684 | −0.1313 |

Referring to FIG. 5 and Table 4, the lithium batteries prepared according to Example 8, 9, and 12 have decreased discharge voltage drop in comparison with the lithium batteries prepared according to Comparative Examples 5 to 6.

Evaluation Example 2

Energy Density and Capacity Retention

The lithium batteries prepared according to Examples 7 to 10, and 12, and Comparative Examples 4 and 5 were charged and discharged twice at a temperature of 25° C. (formation process). The lithium batteries that had been subjected to the first formation process were charged with a constant current at a 0.1 C rate until their respective voltages reached 4.7 V, and then discharged with a constant current at a 0.1 C rate until their respective voltages reached 2.5 V.

The lithium batteries that had been subjected to the formation process were charged with a constant current at a 0.5 C rate until their respective voltages reached 4.7 V, and then discharged with a constant current at a 0.2 C rate until their respective voltages reached 2.5 V. The conditions of the charging and discharging and the conditions of the discharge capacities of the exemplary lithium batteries were standardized.

Subsequently, the lithium batteries were charged with a constant current at a 1 C rate in the form above and then discharged with a constant current at a 1 C rate until their respective voltages reached 2.5 V. A discharge capacity (discharge capacity in the $1^{st}$ cycle) was measured. Such charging and discharging were repeatedly performed, and the discharge capacities of each of the charge and discharge cycles and the discharge capacity in the $100^{th}$ cycle were measured. The results are shown in FIGS. 6 and 7 and Table 5.

Figure 6:
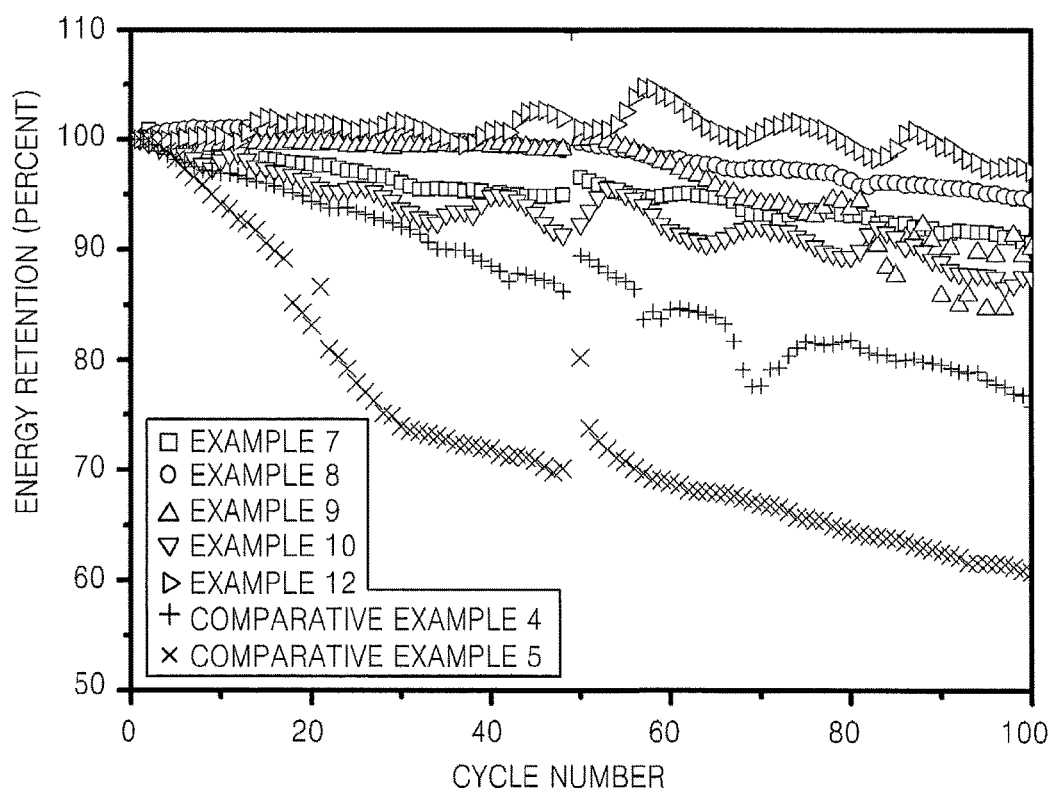
FIG. 6 is a graph of energy retention (percent, %) versus a cycle number, and is a graphical view showing gravimetric energy density of electrodes depending on the number of each cycle of lithium batteries prepared according to Examples 7 to 10, and 12 and Comparative Examples 4 and 5.
Figure 7:
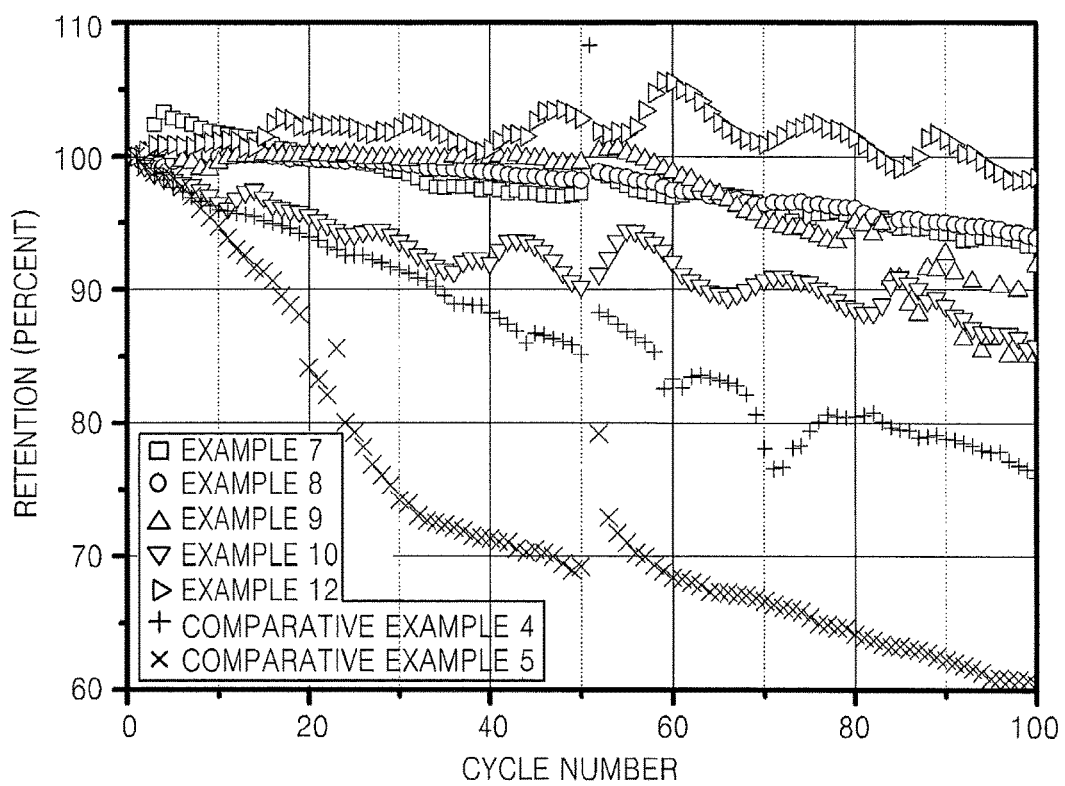
FIG. 7 is a graph of retention (percent, %) versus a cycle number, and is a graphical view showing capacity retention ratio depending on the number of each cycle of lithium batteries prepared according to Examples 7 to 10, and 12 and Comparative Examples 4 and 5.

FIG. 6 is a graphical view showing energy retention based on specific energy of an electrode versus cycle number of the lithium battery. FIG. 7 is a graphical view showing capacity retention based on the specific capacity versus cycle number of the lithium battery. Energy retention was calculated by Equation 2 below, and capacity retention was calculated by Equation 3 below.

$$\text{Energy retention [\%]} = [\text{specific energy at the } 100^{th} \text{ cycle/specific energy at the } 1^{st} \text{ cycle}] \times 100 \quad \text{Equation 2}$$

$$\text{Capacity retention [\%]} = [\text{discharge specific capacity at the } 100^{th} \text{ cycle/discharge specific capacity at the } 1^{st} \text{ cycle}] \times 100 \quad \text{Equation 3}$$

TABLE 5

|  | Energy density at the 1st cycle [Wh/kg] | Energy retention [%] | Discharge capacity at the 1st cycle [mAh/g] | Capacity retention [%] |
|---|---|---|---|---|
| Example 7 | 941.85 | 87.04 | 259.15 | 90.61 |
| Example 8 | 900.47 | 92.00 | 247.51 | 94.52 |
| Example 9 | 600.43 | 88.90 | 163.94 | 90.16 |
| Example 10 | 926.46 | 83.85 | 254.20 | 87.56 |
| Example 12 | 729.03 | 93.75 | 202.16 | 97.13 |
| Comparative Example 4 | 959.16 | 73.42 | 265.10 | 75.82 |
| Comparative Example 5 | 952.15 | 58.94 | 262.48 | 60.79 |

Referring to FIGS. 6 and 7, and Table 5, it was confirmed that the lithium batteries prepared according to Examples 7 to 10 and 12 had improved energy retention and capacity retention in comparison with the lithium batteries prepared according to Comparative Examples 4 and 5, resulting in improved cycle life characteristics.

As described above, according to the above embodiment, a cathode active material includes a lithium metal oxide composite including at least two domains. Lithium or some of the transition metals included in a domain are doped by heterogeneous elements so that a lithium battery including the lithium metal oxide composite may provide reduced discharge voltage drop and improved cycle life characteristics.

It should be understood that the exemplary embodiments described therein shall be considered in a descriptive sense only and not for purposes of limitation. Descriptions of features, advantages, or aspects within each embodiment shall be considered as available for other similar features, advantages, or aspects in other embodiments.

What is claimed is:

1. A cathode active material comprising:
   a lithium metal oxide composite comprising a first domain and a second domain and represented by Formula 1:

$$x[Li_{2-y}(M1)_{1-z}(M2)_{y+z}O_3]\text{-}(1-x)[LiMeO_2] \quad \text{Formula 1}$$

wherein
   $0 < x < 1$,
   $0 < y < 1$,
   $0 < z < 1$,
   $0 < y+z < 1$,
   M1 comprises at least one transition metal,
   M2 comprises at least one metal selected from magnesium (Mg), aluminum (Al), vanadium (V), zinc (Zn), molybdenum (Mo), niobium (Nb), lanthanum (La), and ruthenium (Ru), and
   Me comprises at least one metal selected from nickel (Ni), cobalt (Co), manganese (Mn), iron (Fe), chromium (Cr), titanium (Ti), copper (Cu), aluminum (Al), magnesium (Mg), zirconium (Zr), and boron (B).

2. The cathode active material of claim 1, wherein a range of y in Formula 1 is $0 < y < 0.5$.

3. The cathode active material of claim 1, wherein a range of z in Formula 1 is $0 < z < 0.5$.

4. The cathode active material of claim 1, wherein M1 is Mn.

5. The cathode active material of claim 1, wherein the lithium metal oxide composite comprises a domain having a crystal structure in which a lattice constant c of a length of a c-axis is 14.24 Angstroms or greater.

6. The cathode active material of claim 1, wherein a ratio of a peak intensity of a primary peak corresponding to a 003 plane to a peak intensity of a secondary peak corresponding to a 104 plane in an X-ray diffraction spectrum of the lithium metal oxide is 1.3 or greater.

7. The cathode active material of claim 1, wherein a particle size of crystalline particles of the lithium metal oxide composite, when determined by analysis of a full width at half maximum of a peak corresponding to an 003 plane in an X-ray diffraction spectrum, is 80 nanometers or greater.

8. The cathode active material of claim 1, wherein a separation distance between a peak corresponding to a 108 plane having a scattering angle of about 64.5°±0.5° two-theta and a peak corresponding to a 110 plane having a scattering angle of about 65.5°±0.5° two-theta in an X-ray diffraction spectrum of the lithium metal oxide composite is 0.8° or greater.

9. The cathode active material of claim 1, wherein the first domain is represented by Formula 2:

$$Li_{2-y}(M1)_{1-z}(M2)_{y+z}O_3 \quad \text{Formula 2}$$

wherein the second domain is represented by Formula 3:

$$LiMeO_2. \quad \text{Formula 3}$$

10. A lithium battery comprising:
    a cathode;
    an anode; and
    an electrolyte disposed between the cathode and the anode;
    wherein the cathode comprises the cathode active material of claim 1.

11. The lithium battery of claim 10, wherein an operational voltage of the cathode active material is 4.3 Volts or greater.

12. A method of preparing a lithium metal oxide composite comprising a first domain and a second domain, the method comprising:
    contacting a first lithium precursor, a transition metal precursor, and a metal dopant precursor to prepare a first mixture;
    firstly heat treating the first mixture to prepare a first domain lithium metal oxide;
    contacting the first domain lithium metal oxide with a second lithium precursor and a metal precursor to prepare a second mixture; and
    secondly heat treating the second mixture to prepare a second domain lithium metal oxide to prepare the lithium metal oxide composite, wherein the lithium metal oxide composite is represented by Formula 1:

$$x[Li_{2-y}(M1)_{1-z}(M2)_{y+z}O_3]\text{-}(1-x)[LiMeO_2] \quad \text{Formula 1}$$

wherein
    $0 < x < 1$,
    $0 < y < 1$,
    $0 < z < 1$,
    $0 < y+z < 1$,

M1 comprises at least one transition metal,

M2 comprises at least one metal selected from magnesium (Mg), aluminum (Al), vanadium (V), zinc (Zn), molybdenum (Mo), niobium (Nb), lanthanum (La), and ruthenium (Ru), and Me comprises at least one metal selected from nickel (Ni), Cobalt (Co), manganese (Mn), iron (Fe), chromium (Cr), titanium (Ti), copper (Cu), aluminum (Al), magnesium (Mg), zirconium (Zr), and boron (B).

13. The method of claim 12, wherein the first lithium precursor and the second lithium precursor each independently comprise at least one lithium salt selected from $Li_2CO_3$, LiOH, $Li(CO_2)_2$, LiCl, $LiOCO_2CH_3$, and LiF.

14. The method of claim 12, wherein the transition metal precursor comprises at least one selected from $MnCO_3$, $Mn(SO_4)_2$, $Mn(NO_3)_2$, $MnCl_2$, $MnBr_2$, $(CH_3CO_2)_2Mn$, $NiCO_3$, $NiSO_4$, $NiNO_3$, $NiCl_2$, $NiBr_2$, $(CH_3CO_2)_2Ni$, $CoCO_3$, $CoSO_4$, $Co(NO_3)_2$, $CoCl_2$, $CoBr_2$, $(CH_3CO_2)_2Co$, $FeCO_3$, $FeSO_4$, $Fe(NO_3)_2$, $Fe(NO_3)_3$, $FeCl_2$, $FeCl_3$, $FeBr_2$, $FeBr_3$, $(CH_3CO_2)_2Fe$, $CrCO_3$, $Cr(SO_4)_2$, $Cr(NO_3)_2$, $CrCl_2$, $CrBr_2$, $(CH_3CO_2)_2Cr$, and a hydrate thereof.

15. The method of claim 12, wherein the metal dopant precursor comprises at least one selected from $Al_2O_3$, MgO, $V_2O_5$, $VO_2$, $V_2O_3$, VO, ZnO, $MoO_3$, $Nb_2O_3$, $La_2O_3$, and $RuO_2$.

16. The method of claim 12, wherein an amount of the metal dopant precursor is in a range of about 0.01 mole percent to about 0.5 mole percent, based on a total moles of the first lithium precursor and the transition metal precursor.

17. The method of claim 12, wherein the first thermal treatment is performed at a temperature of about 400° C. to about 800° C.

18. The method of claim 12, wherein the metal precursor comprises at least one selected from $NiCO_3$, $Ni(SO_4)_2$, $Ni(NO_3)_2$, $NiCl_2$, $NiBr_2$, $(CH_3CO_2)_2Ni$, $MnCO_3$, $Mn(SO_4)_2$, $Mn(NO_3)_2$, $MnCl_2$, $MnBr_2$, $(CH_3CO_2)_2Mn$, $CoCO_3$, $Co(SO_4)_2$, $Co(NO_3)_2$, $CoCl_2$, $CoBr_2$, $(CH_3CO_2)_2Co$, $FeCO_3$, $FeSO_4$, $Fe(NO_3)_2$, $Fe(NO_3)_3$, $FeCl_2$, $FeCl_3$, $FeBr_2$, $FeBr_3$, $(CH_3CO_2)_2Fe$, $CrCO_3$, $Cr(SO_4)_2$, $Cr(NO_3)_2$, $CrCl_2$, $CrBr_2$, $(CH_3CO_2)_2Cr$, $TiCO_3$, $Ti(SO_4)_2$, $Ti(NO_3)_2$, $TiCl_2$, $TiBr_2$, $CuCO_3$, $CuSO_4$, $Cu(NO_3)_2$, $CuCl_2$, $CuBr_2$, $(CH_3CO_2)_2Cu$, $AlCO_3$, $Al(SO_4)_3$, $Al(NO_3)_3$, $AlCl_3$, $AlBr_3$, $(CH_3CO_2)_3Al$, $MgCO_3$, $MgSO_4$, $Mg(NO_3)_2$, MgCl, MgBr, $(CH_3CO_2)_2Mg$, $Zr(CO_3)_2$, $Zr(SO_4)_2$, $Zr(NO_3)_2$, $ZrCl_4$, $ZrBr_4$, $B_2(CO_3)_3$, $B_2(SO_4)_3$, $B(NO_3)_3$, $BCl_3$, $BBr_3$, and a hydrate thereof.

19. The method of claim 12, wherein the second thermal treatment is performed at a temperature of about 700° C. to about 950° C.

20. The method of claim 12, further comprising at least one selected from mechanically milling the first domain lithium metal oxide, and mechanically milling the lithium metal oxide composite represented by Formula 1.

* * * * *